US010422472B2

(12) United States Patent
Inouye

(10) Patent No.: US 10,422,472 B2
(45) Date of Patent: *Sep. 24, 2019

(54) DEVICE FOR MOUNTING ACCESSORIES TO GYM RIGGING IMPLEMENTS

(71) Applicant: Warren Inouye, Irvine, CA (US)

(72) Inventor: Warren Inouye, Irvine, CA (US)

(73) Assignee: Warren Inouye, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,590

(22) Filed: Nov. 21, 2016

(65) Prior Publication Data

US 2018/0142831 A1    May 24, 2018

(51) Int. Cl.

| A47F 5/00 | (2006.01) |
|---|---|
| F16M 13/02 | (2006.01) |
| A61H 15/00 | (2006.01) |
| A63B 21/055 | (2006.01) |
| A63B 17/04 | (2006.01) |
| A63B 21/16 | (2006.01) |
| A63B 21/06 | (2006.01) |
| A63B 23/12 | (2006.01) |

(52) U.S. Cl.
CPC ........... *F16M 13/022* (2013.01); *A61H 15/00* (2013.01); *A63B 17/04* (2013.01); *A63B 21/0557* (2013.01); *A63B 21/16* (2013.01); *A61H 2015/0007* (2013.01); *A61H 2201/0119* (2013.01); *A61H 2201/1284* (2013.01); *A63B 21/06* (2013.01); *A63B 23/1218* (2013.01); *A63B 23/1227* (2013.01); *A63B 2225/093* (2013.01)

(58) Field of Classification Search
CPC .. F16M 13/022; A61H 15/00; A63B 21/4035; A63B 21/0557; A63B 23/1218; A63B 23/1227; F16B 19/00
USPC ............. 248/300; 482/95, 96, 131, 132, 142
See application file for complete search history.

(56) References Cited

U.S. PATENT DOCUMENTS

| 4,384,715 | A | | 5/1983 | Savio et al. | |
|---|---|---|---|---|---|
| 5,554,083 | A | * | 9/1996 | Chen ................ | A63B 21/00181 482/138 |
| 6,001,051 | A | * | 12/1999 | Chuan-Pin ......... | A63B 21/0552 482/131 |
| 6,113,523 | A | * | 9/2000 | Medina .............. | A63B 21/1672 482/131 |
| 6,196,954 | B1 | * | 3/2001 | Chen .................... | A63B 22/203 482/131 |

(Continued)

*Primary Examiner* — Gwendolyn W Baxter
(74) *Attorney, Agent, or Firm* — Chang & Hale LLP

(57) ABSTRACT

An accessory bracket is described for weight lifting accessories and/or fitness accessories which may be able to fit onto each of the three common sizes of gym rigging implements without alterations. The accessory bracket may be able to hold the accessories rigidly and strongly even with the application of forces from all directions, including upwards. Gym rigging may be perforated with a number of holes that may be used for attaching the accessory bracket. These holes are often as close to each other to allow for a great deal of adjustability in the height of accessories which may be mounted to the gym rigging implement. The diameter of the perforations are sized so that a quick detach pin can go through the perforations and through corresponding holes in the bracket to secure the bracket, and any attached accessory, to the gym rigging implement.

15 Claims, 1 Drawing Sheet

(56) References Cited

U.S. PATENT DOCUMENTS

| | | |
|---|---|---|
| 8,449,438 B2 | 5/2013 | Morin |
| 9,827,458 B2* | 11/2017 | Dalton ................ A63B 21/055 |
| 2004/0009853 A1 | 1/2004 | Smith |
| 2010/0146903 A1* | 6/2010 | Ellis .................... E04B 2/7457 |
| | | 52/696 |
| 2011/0124476 A1* | 5/2011 | Holley ................. A63B 23/02 |
| | | 482/121 |
| 2014/0221881 A1* | 8/2014 | Schlauder .......... A63B 21/0421 |
| | | 601/23 |
| 2018/0142832 A1* | 5/2018 | Inouye ................ F16M 13/022 |

* cited by examiner

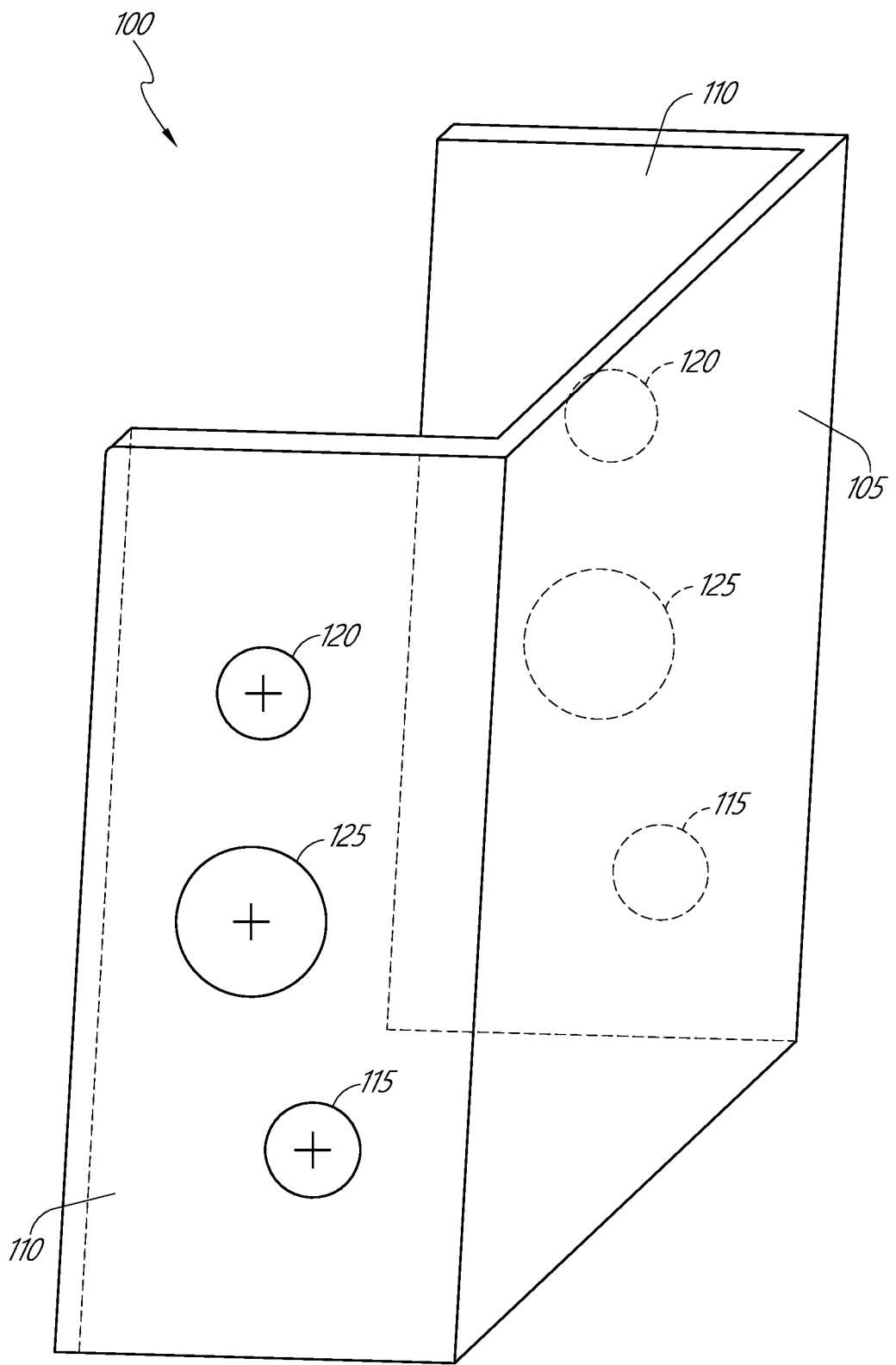

DEVICE FOR MOUNTING ACCESSORIES TO GYM RIGGING IMPLEMENTS

BACKGROUND OF THE RELEVANT PRIOR ART

One or more embodiments of the invention generally relate to gym equipment. More particularly, certain embodiments of the invention relate to an accessory bracket that may be used on various different sizes of gym rigging.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Currently, there are three sizes of gym rigging commonly in use: 2×3 inch gym rigging, herein referred to as "2×3 rigging", 3×3 inch rigging that is light weight, herein referred to as "light 3×3 rigging, and 3×3 inch heavy weight rigging, herein referred to as "heavy 3×3 rigging". Some gyms may use 2×2 rigging; however, it is believed that most gyms are replacing 2×2 rigging with stouter rigging, as the larger rigging may be associated with modernity, greater strength and durability, and heavier weights. Users may attach various different types of weight lifting or fitness accessories to this gym rigging such as, but not limited to, self-massage attachments, Matador devices for performing dips, storage for weight plates, push up bars, pull up bars, J hooks that may be used to hold weight lifting bars, etc. Typically, these accessories may be attached to the rigging with brackets. Brackets may be permanently attached to accessories by a permanent means, such as welding. Brackets may also be attached to accessories by temporary or changeable means, such as attaching a receptacle to the face of the bracket and then fixing the distal end of the receptacle so that accessories can be temporarily attached to the receptacle. For instance, if a receptacle with a threaded end is attached to the face of a bracket, accessories may be screwed to the receptacle by means of that threaded distal end. As another example, if a bracket is fitted with slot in the face of the bracket, devices such as a hook may be slipped into the slot and such hook would be held in place by its design. The hook could be used to hang or attach accessories to weight lifting rigging, such as elastic tubing which is used to exercise and strengthen shoulders and arms. The hook could also be used to attach a stout elastic band which is often used by physical therapist and weight lifting athletes to exercise the hips and legs. Such elastic bands are presently looped around gym rigging in a big, loose knot, but doing so takes up time and uses up a substantial length of the elastic band. With a hook, the bands would be simply slipped over the hook with little or no loss of length. The bracket with the hook fitted to it could be raised and lowered quickly and strongly to allow the elastic bands to be positioned at any height. The bracket could be designed to allow the attachment of small hooks for light weight bands to large hooks for very strong elastic bands. Gym rigging may be perforated with a number of holes that may be used for attaching accessory brackets. These holes are often as close to each other as one inch to allow for a great deal of adjustability in the height of accessories which may be mounted to the gym rigging. The diameter of the perforations are sized so that a quick detach pin can go through the perforations and through corresponding holes in the bracket to secure the bracket, and any attached accessory, to the rigging.

By way of educational background, an aspect of the related technology generally useful to be aware of is that accessory brackets are generally made to attach to a specific size of rigging and typically cannot be used interchangeably between rigging of different sizes. For example, without limitation, an ordinary accessory bracket made for 2×3 rigging typically cannot fit 3×3 rigging because the holes drilled in the side flanges of the 2×3 accessory bracket may not match up to the perforations in the 3×3 bar. Thus, one may expect that if a user owns rigging in different sizes, the user may need to purchase a separate set of accessories for each size of rigging. In addition, current brackets are typically designed to hold accessories on the gym rigging in a way that resists only downward forces, so that when upward forces are applied to the typical bracket, the bracket and the accessory are tilted upward. Moreover, it is believed that there is little uniformity in the design, size, and shape of brackets on the market today. This lack of uniformity may result in there being many different methods and systems for mounting the accessories to the gym rigging, which may create clutter in the gym and added costs.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a transparent side perspective view of an exemplary accessory bracket that may be attached to multiple sizes of gym rigging, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The Applicant hereby gives notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, are generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction with, some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter. Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

One embodiment of the present invention may provide an accessory bracket for weight lifting accessories and fitness accessories which may be able to fit onto each of the three common sizes of gym rigging without alterations. Further, some embodiments may be implemented so that the accessory bracket may be able to hold a weight lifting accessory or fitness accessory rigidly and strongly even with the application of forces from all directions, including upwards.

FIG. 1 is a transparent side perspective view of an exemplary accessory bracket 100 that may be attached to multiple sizes of gym rigging, in accordance with an embodiment of the present invention. In the present embodiment, bracket 100 may be configured in a rectangular U-shape with a faceplate 105 approximately 3 inches in width, which may typically enable bracket 100 to fit on 2×3 rigging, 3×3 light rigging, and 3×3 heavy rigging. In this particular embodiment of the bracket, the bracket is manufactured with a three inch width. This three inch width is common to all three common sizes of gym rigging, and this is what makes it possible for one embodiment of the bracket to fit all three different sizes of gym rigging. Another embodiment of the bracket which is not shown in the application would be a bracket that is two inches in width. Such a bracket would fit an older generation of gym rigging which is 2×2 inches in diameter. This dimension of gym rigging is rarely found now, though it was once commonly used. The same bracket could be used without alteration to fit the present generation of gym rigging that is 2×3 inches. The same bracket would have to be drilled out in the flanges with holes that would match the size of perforations in the older 2×2 rigging and the currently used 2×3 rigging. Though the sizes and dimensions are different, the principles are the same. Likewise, if gym rigging continues to grow in strength and size, the bracket would adapted to fit larger rigging in the same manner. The embodiment seen in FIG. 1 is three inches in width and it is made so that the side flanges snugly fit around the sizes of the gym rigging. It is possible to make the width of the bracket wide so that there is space between the inside dimensions of the flanges of the bracket and the outside diameters of the gym rigging. Therefore, if there were a gym rigging that is four inches wide, for example, a bracket that is four inches wide could be constructed and drilled out in a manner which would allow such a wide bracket to be attached to hypothetical four inch rigging, and to the three common sizes of 2×3, light 3×3 and heavy 3×3 rigging. However, if such a bracket were constructed, the mechanic would have to be very careful about materials that are strong enough to serve in that design. The snugness of the bracket to the outside walls of the gym rigging give the bracket (and the accessory that is attached to the bracket) strength. When the bracket no longer snugly embraces the rigging, an entire new set of strength considerations come into play and the type and thickness of materials would have to be considered to make such a bracket safe. Further, when there is a gap between the flanges of the bracket and the gym rigging, the accessory could possibly slide from side to side or at least creep to one side or the other and thereby reduce the rigidity of the bracket and accessory. A four inch piece of rigging would be rare, if it exists at all, and so this discussion is about possibilities and not pragmatic applications of the invention to solve current problems. The dimensions shown in FIG. 1 address the needs of the current sizes of gym rigging in commercial use. Bracket 100 may also comprise side flanges 110 which may be wide enough to allow for the placement of three sets of holes that may match up to the perforations in all three common sizes of gym rigging. Side flanges are shown as rectangular in shape. Some alternate embodiments may comprise side flanges with various different shapes such as, but not limited to, rounded flanges or triangular flanges. In the present embodiment side flanges 110 may be approximately 2⅝ inches wide, however, some embodiments may be made with side flanges that are wider or narrower. In the present embodiment, a 2×3 set of holes 115 may be provided to line up with the perforations in 2×3 rigging. A small 3×3 set of holes 120 may be provided to line up with the perforations in light 3×3 rigging, and a large 3×3 set of holes 125 may be provided to line up with the perforations in heavy 3×3 rigging. The three sets of holes may typically enable bracket 100 to be interchanged between 2×3 rigging, light 3×3 rigging, and heavy 3×3 rigging with no alterations. The size of the perforations in the three sizes of gym rigging and the corresponding quick detach pins are standard to the industry and typically cannot be changed, therefore, the holes in side flanges 110 may be appropriate in size to match these standard sizes. In addition, the perforations in the three sizes of gym rigging are typically located on the center line of the rigging. In the present embodiment, 2×3 holes 115 may be about 22/64 of an inch in diameter with the centers located approximately 1 inch from faceplate 105. Small 3×3 holes 120 may be about 22/64 of an inch in diameter with the centers located approximately 1½ inches from faceplate 105. Large 3×3 holes may be about 1 1/16 inches in diameter with the centers located approximately 1½ inches from faceplate 105. The centers of large 3×3 holes 125 are approximately 1½ inches from the centers of small 3×3 holes 120 and 2×3 holes 115. It is contemplated that some embodiments may be configured with the holes closer together or further apart. The actual distance of one hole from another hole is a matter of experimentation and experience in working with various materials and designs. adapting the bracket to the weight of the accessories which might be attached to the bracket. These distances would also be affected by the type of material being used to construct the bracket. The combination of the weight of the expected accessories and the type of material would be taken into consideration by the experienced mechanic in constructed a bracket that would be safe in its intended application. Safety is the primary concern, because weight lifting accessories must always be between holes and An alternate embodiment of the present invention may be implemented with only two sets of holes wherein one set of holes may be used with 2×3 rigging and the other set may be used on both light and heavy 3×3 rigging.

It is believed that when an upward force is applied to a conventional accessory bracket, which may be shorter in height than the present embodiment, the bracket typically lifts up in response as there may not be an adequate portion of the bracket above the fulcrum point to press against the gym rigging and to help prevent upward movement. An aspect of the present embodiment is to be made sufficiently tall to mitigate an upward force on bracket 100 when those portions of bracket 100 above the fulcrum point press against the gym rigging to typically prevent further upward movement. In the present embodiment, bracket 100 may be at least 6 inches in height. This height may help to ensure that the portion of bracket 100 which is above the fulcrum point of a quick detach pin inserted through one of the three sets of holes is tall enough to resist upward forces just as strongly as downward forces. It is contemplated that brackets in some alternate embodiments may vary in height. The actual height of the bracket need not be exact so long as it is long enough to prevent upward movement of an attached accessory when a force is applied in an upward direction. One who is skilled and experienced in the manufacture of weight lifting equipment will pick the height of the bracket depending on a combination of (a) how much space separates the various holes from each and how that spacing affects the overall strength of the bracket, and (b) and how little movement such mechanic will allow in the bracket. If very little movement is to be allowed, the bracket will be longer, and if some movement is allowable, a shorter bracket might be used. The bracket depicted in FIG. 1 is six inches (6") tall. This particular hole spacing and height of the bracket combination provides substantial strength and only a little movement in the bracket when upward forces are encountered but alternate embodiments may comprise an elongated faceplate that extends past the side flanges at the top and/or bottom. Yet other alternate embodiments may comprise extensions of various different shapes and sizes, such as, but not limited to rods or flat tabs, that may extend from the top and/or bottom of the faceplate to resist upward or downward force. Some embodiments may also include a coating or roughened texture on one or more inside surfaces that may create additional friction between the bracket and the rigging to further resist movement of the bracket when subjected to upward, downward, or side to side forces.

In the present embodiment, bracket 100 may be made of a single a piece of plate steel. Holes 115, 120, and 125 may be drilled into the plate at the appropriate locations, and then the plate may be bent and formed into a U-shape so that all of the sets of holes may line up with the perforations in the rigging as required. The steel plate out of which bracket 100 may be made typically possesses characteristics which allow the plate to be drilled, formed, bent, deburred, and in some cases welded. Alternate means of manufacture may be used in some embodiments including, without limitation, welding, punching, die forming, cutting, etc. Though the Invention described in this application is made of steel plate, the bracket may actually be made of many different types of materials, such as alloys of steel (such as stainless steel) and aluminum. There are many different types and grades of steel, also. Therefore, as the factors of strength, weight and cost become involved, and as the particular application of the bracket is considered, the mechanic may choose to construct the bracket out of other materials which match the weight, strength, environmental factors, and cost requirements. In typical use of the present embodiment, various different weight lifting accessories and fitness accessories can be attached to bracket 100 in a number of ways including, without limitation, welding or connecting to a receptacle on the bracket. Because of cost and strength factors involved with the manufacture of weight lifting accessories, welding will likely be the most common means of attaching accessories to the brackets, and the most common materials for constructing brackets shall be plate steel. However, as described above there are other ways of attaching accessories to the brackets, such as the threaded receptacle or hook. After being attached to bracket 100, the accessory may be mounted to gym rigging by sliding the bracket 100 onto the rigging and inserting a quick detach pin into the appropriate set of holes that correspond to the perforations in the rigging. Since bracket 100 may allow accessories to be attached to any of the three common sizes of gym rigging, bracket 100 may reduce or eliminate the need to purchase accessories for specific sizes of gym rigging. In many cases a gym owner may only need to acquire one set of accessories for his gym even if all three sizes of rigging are used in the gym. Bracket 100 may be used in various settings in addition to commercial gyms such as, but no limited to, home gyms, gym equipment in a physical therapist's office, school gyms, etc. Furthermore, a physical therapist who meets clients in commercial gyms as well as in his office may use the same accessories in both locations using bracket 100, even if the commercial gym uses a different size of gym rigging than he does in his office. If a gym incorporates a bracket such as bracket 100 on all of its accessories, there may be more uniformity in the design, look, and use of the accessories across all sizes of gym rigging, which may also make the use of these accessories easier and more efficient and more economical.

It is contemplated that bracket 100 can be adapted to nearly all weight-lifting and fitness accessories including, but not limited to, self-massage accessories, Matador devices which may be used to perform dips, weight plate storage devices, push up bars which are often attached to gym rigging at different elevations, pull up bars, J hooks which may be used to hold weight lifting bars in elevated positions, hooks for other devices such as, but not limited to resistance bands, etc. When bracket 100 is used in the realm of self-massage, since bracket 100 typically provides a convenient, rigid, quickly adjustable, strong, and safe way to attach a wide variety of self-massage accessories to existing gym rigging, the user is no longer required to lay on foam rollers, balls, or other self-massage devices on the floor. It is believed that holding the self-massage device up off the floor may allow for a superior self-massage. Such massage devices attached to gym rigging by bracket 100 may be held rigidly at a height set by the user, which typically provides accuracy in employing the massage device in the desired location on the body. In many weight lifting and fitness activities, upward forces are rarely encountered, because conventional accessory brackets are often used to hold heavy objects, and the force of gravity typically holds the accessory brackets in place. An aspect of the present embodiment may be to enable bracket 100 to withstand upward forces and sideward forces in addition to downward forces. In the case of self-massage accessories, the upward and sideward forces may result from a user pushing upward, sideward and downward against the self-massage accessory with his body. In order to remain rigid in the face of upward forces, bracket 100 may be made tall enough to provide substantial height above the fulcrum point, which may engage the gym rigging and help prevent further upward movement when an upward force is applied. Making bracket 100 from sturdy plate metal may also help bracket 100 resist side to side forces as side flanges 110 may typically encounter the gym rigging and the strength of the gym rigging along with the strength of side flanges 110 may help prevent further movement in bracket 100. In addition, because bracket 100 may be attached to existing gym rigging, the tremendous strength of the gym rigging may become available to users of different self-massage accessories, which may result in self-massage accessories whose strength can be trusted. Another aspect of the present embodiment may be to provide flexibility in how an accessory which is mounted to gym rigging can be used. The manner in which bracket 100 typically attaches to gym rigging is so simple and uncluttered that the massage accessory being used can often be approached from many angles and directions, which may enable the accessory to be used for massaging virtually any muscle group of the human body.

In some applications, bracket 100 may be used with a device designed to hold a variety of commercially available foam massage rollers. This may enable a user to attach any particular foam roller which the user finds comfortable to gym rigging rather than being forced to use a particular roller which may come with a particular massage device. For example, without limitation, such a device may comprise a high strength steel tube welded directly and perpendicularly to faceplate 105 of bracket 100. In some embodiments a massage ball may be attached to the distal end of a rod which is welded to the face of the bracket. Such a massage ball may be made of a multiplicity of suitable materials such as, but not limited to, various metals, plastic, wood, etc.

Another embodiment of the present invention may comprise attaching a receptacle on the faceplate of the bracket to facilitate the attachment of various accessories to the bracket, making the bracket more universal and adaptable in fitting many accessories. The receptacle is constructed of a short length of round tubing being welded to the bracket, with a nut welded to the distal end of the tubing. Weight lifting or massage accessories would be screwed into the distal end of such tubing. This receptacle may enable weight lifting and fitness accessories to be removably attached to the bracket. This embodiment may provide substantial interchangeability between accessories and between gyms. Yet another embodiment may be implemented in a bracket that is sized to is match up to smaller gym rigging, which may be more commonly used in a home gym, a small scale gym in sports chiropractor's office or in a physical therapist's office, or the rigging which might still be used in some older commercial gyms still utilizing 2×2 rigging. Similarly, to the way bracket 100 may be able to fit 2×3 rigging as well as light and heavy 3×3 rigging, a bracket according to this embodiment may be designed to fit both 2×2 rigging and 2×3 rigging, without alteration. Since both sizes of rigging have one dimension in common, which is 2 inches, the bracket may be configured to fit the 2-inch side of the rigging and may comprise holes that correspond to perforations in each size of rigging.

Yet another embodiment may a bracket that is downsized and configured to allow attachment of weight lifting and self-massage accessories, and other sports equipment to be used on rigging that has been downsized to fit on cars or trucks, so long as the car or truck is equipped with a tow hitch. Tow hitches mounted on the rear of vehicles are often used to mount bike racks, ski racks, snow board carriers, kayak carriers, and other accessories. Vehicles today typically use either a 1½ inch square receptacle or a 2-inch square receptacle for a tow hitch. In the present embodiment, if rigging is attached to the tow bar of a vehicle, a bracket may be provided to allow for the attachment of specialized bike racks, ski racks, snow board racks, kayak racks etc. to such rigging. Because the bracket is very strong, specialized racks of all kinds that would carry equipment of all kinds could be attached to such rigging using the bracket. Because the bracket is movable and strong, such an adjustable equipment carrying rack would also be strong and versatile. Because many vehicles with tow hitches are owned by athletes and others who may appreciate a roadside work out or a roadside self massage, self-massage accessories and other weightlifting and fitness accessories may be mounted to gym rigging using the bracket similar to bracket 100 described by way of example in the foregoing. This may enable a user to have a portable gym that may be used virtually anywhere. For example, without limitation, such a portable gym may be used on the side of the road before or after a bike ride, a day on the ski slopes, a day paddling, etc.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing an accessory bracket that may be used on various different sizes of gym rigging according to the present invention will be apparent to those skilled in the art. Various aspects of the invention have been described above by way of illustration, and the specific embodiments disclosed are not intended to limit the invention to the particular forms disclosed. The particular implementation of the accessory bracket may vary depending upon the particular context or application. By way of example, and not limitation, the accessory brackets described in the foregoing were principally directed to weightlifting and fitness implementations; however, similar techniques may instead be applied to warehouse racking systems or household shelving units with perforated supports, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following claims are hereby incorporated into the detailed description, with each claim standing on its own as a separate embodiment.

What is claimed is:

1. A device for attaching an accessory appliance to a variety of differing gym rigging implements with different post and perforation configurations, the device comprising:
   a faceplate section;
   a pair of flange segments disposed on proximate sides of said faceplate section;
   a first set of matching hole portions disposed on each of said pair of flange segments;
   a second set of matching hole portions disposed on each of said pair of flange segments, the second set of matching hole portions having a larger diameter than the first set of matching hole portions and having centers that are positioned the same distance from the faceplate section as the centers of the first set of matching hole portions; and
   a third set of matching hole portions disposed on each of said pair of flange segments, the third set of matching hole portions having the same diameter as the first set of matching hole portions and having centers positioned closer to the faceplate section than the centers of the first set of matching hole portions,
   wherein the arrangement of the first set of matching hole portions, the second set of matching hole portions, and the third set of matching hole portions on the pair of flange segments are adapted to be compatible with the variety of differing gym rigging implements with different post and perforation configurations.

2. The device of claim 1, wherein said first set of matching hole portions is configured to be compatible with a first rigging implement configuration.

3. The device of claim 2, wherein said second set of matching hole portions is configured to be compatible with a second rigging implement configuration different from the first rigging implement configuration.

4. The device of claim 3, wherein said third set of matching hole portions is configured to be compatible with a third gym rigging implement configuration different from the first rigging implement configuration and the second rigging implement configuration.

5. The device of claim 1 wherein the faceplate section and the pair of flange segments are sized to be mounted to 2×3 gym rigging and 3×3 gym rigging.

6. The device of claim 5 wherein the first set of matching hole portions is configured to be compatible with 3×3 light rigging light, the second set of matching hole portions is configured to be compatible with 3×3 heavy rigging, and the third set of matching hole portions is configured to be compatible with 2×3 rigging.

7. The device of claim 5 wherein the faceplate section is approximately 3 inches in width.

8. The device of claim 1 wherein the faceplate section and the pair of flange segments are made of a single piece of metal.

9. An accessory bracket configured to be attached to multiple sizes of gym rigging with differing bar and perforation configurations, the accessory bracket comprising:
   a faceplate section, wherein said faceplate section is configured to enable at least one of, a weight lifting accessory, a fitness accessory, and a self-massage accessory to attach to a gym rigging implement;
   a pair of flange segments disposed on opposite sides of said faceplate section to form a rectangular U-shape with the faceplate section having a width of approximately 3 inches between each flange segment; and
   a set of matching hole portions disposed on each of said pair of flange segments configured to receive at least one of a quick detach pin contrivance and a gym bar implement, said set of matching hole portions comprising at least a first, second, and third set of matching hole portions disposed on each of said pair of flange segments, wherein said set of matching hole portions is configured to be align with perforations of different gym rigging configurations so that at least one set of matching hole portions has a different diameter from the other sets of matching hole portions and another set of matching hole portions has its centers offset from the other sets of matching hole portions, wherein the arrangement of the set of matching hole portions is adapted to be compatible with the multiple sizes of gym rigging with differing bar and perforation configurations.

10. The accessory bracket of claim 9 wherein diameters of the first set of matching hole portions are approximately 11/32 inches.

11. The accessory bracket of claim 10 wherein centers of the first set of matching hole portions are located approximately 1.5 inches from the faceplate section.

12. The accessory bracket of claim 11 wherein centers of the third set of matching hole portions are located approximately 1 inch from the faceplate section.

13. The accessory bracket of claim 12 wherein the diameters of the second set of matching hole portions are approximately 1 1/16 inches.

14. The accessory bracket of claim 9 wherein each of the pair of flange segments is approximately 2 5/8 inches in width.

15. The accessory bracket of claim 9 wherein the faceplate section is approximately 6 inches in height.

* * * * *